INVENTOR
RAOUL MARLOT
By Orwin D. Thompson
ATTY.

INVENTOR
RAOUL MARLOT
BY Irwin S. Thompson
ATTY

United States Patent Office
3,122,678
Patented Feb. 25, 1964

1

3,122,678
SPEED REGULATING ARRANGEMENT FOR POWER UNITS CHIEFLY TURBINES DRIVING ELECTRIC GENERATORS
Raoul Marlot, Saint-Jean-de-Luz, France, assignor to Electricite de France-Service National, Paris, France, a corporation of France
Filed May 27, 1960, Ser. No. 32,419
Claims priority, application France June 6, 1959
8 Claims. (Cl. 317—5)

My invention has for its object the regulation of the speed of power units and, more particularly, of turbines driving electric generators in power stations, which are interconnected through a distribution network.

Said regulation is ensured, at the present time, by mechanical regulators including generally a primary adjustment through which the opening of the turbine blading is controlled by the value of the speed or frequency as compared with a reference speed or frequency, while an auxiliary adjustment is operative upon modification of said reference speed or frequency.

My invention has also for its object the execution of such a regulating arrangement resorting no longer to mechanical means, but to electronic means.

According to my invention, the regulating arrangement includes chiefly a circuit loading a condenser through at least one reference voltage, an electronic gate adapted to open when the loading voltage of said condenser rises above a predetermined threshold, means for speedily discharging said condenser under the action of discharge pulses produced synchronously with the speed to be controlled, and means controlling said speed and governed by the condition of the gate.

The characteristic features and advantages of my invention will appear in the reading of the following description of an electronic equipment according to said invention, said equipment being adapted to provide a regulation equivalent to that provided by mechanical regulators of the type referred to. Said description will be given with reference to the accompanying drawings, wherein.

Figure 1:
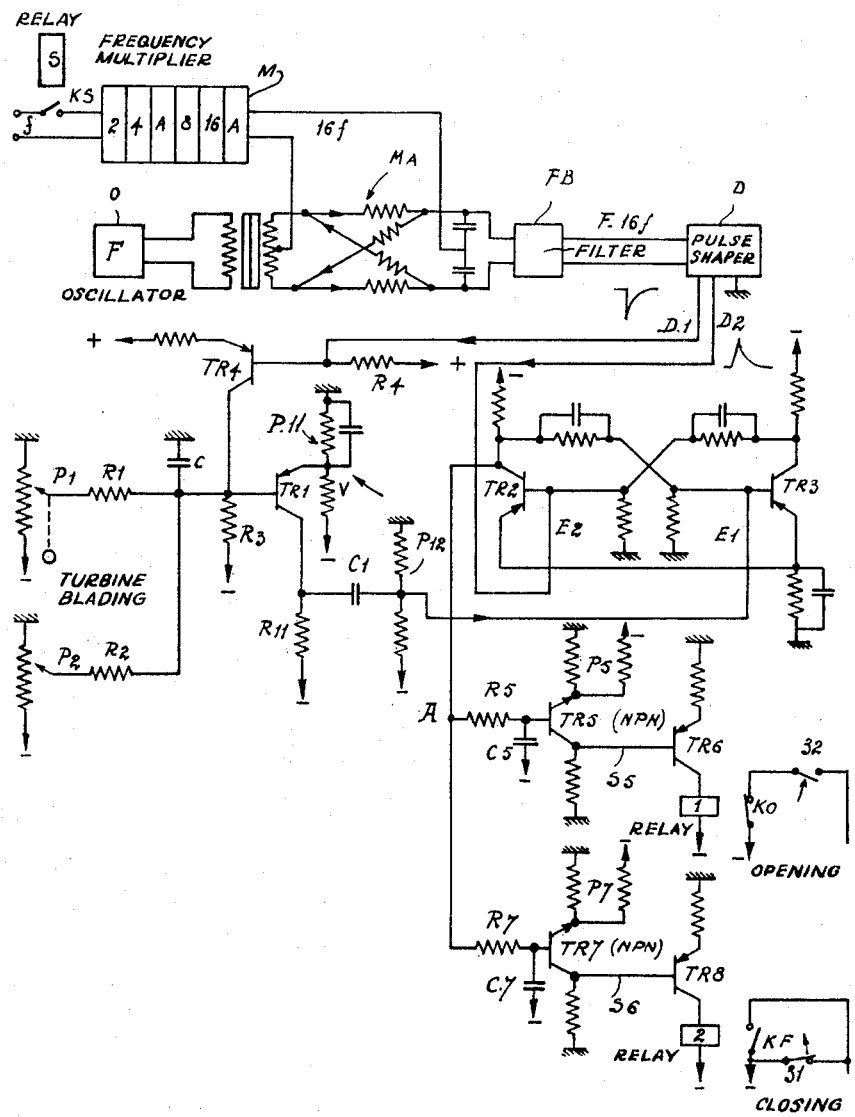
FIG. 1 is a wiring diagram of a regulating arrangement according to my invention, as applied to the regulation of the speed of the turbine driving an electric generator.

The different transistors illustrated in said wiring diagrams are of the PNP type, except those carrying a labelling NPN showing they are of the opposite type.

An alternating voltage at a frequency $f$ tapped off the alternator to be adjusted and which is not illustrated is fed, through the agency of a safety switch $ks$ controlled by a relay S, to the input of a frequency multiplier M of a known type including four frequency-doubling elements constituted each by a ring-shaped rectifier and a tuned transformer, together with one or two voltage-amplifying elements A. Said frequency-multiplier produces at its output a voltage of a frequency equal to $16f$, provided $f$ approximates the nominal frequency, say 50 cycles. Said voltage at a frequency $16f$ is applied to one of the inputs of a ring-shaped modulator MA, while an alternating voltage at an unvarying frequency F produced by an oscillator O is applied to the other input of said modulator. The output end of the latter is connected with a low-pass filter which allows only the component having a frequency $F-16f$ to pass. Said component is applied to a deriving stage or pulse shaper D which feeds pulses at the beginning of each cycle, through its output terminals D1 and D2, with a steep front edge and an exponential rear edge, said pulses being negative at D1 and positive at D2.

A condenser C, on the other hand, is loaded at a predetermined negative voltage by two voltages fed through the agency, respectively, of the resistances R1 and R2 from the sliders of the potentiometers P1 and P2. The potentiometer P1 provides for primary adjustment and has its slider mechanically coupled with the blading of the turbine, the maximum of said potentiometer corresponding to a full opening of said blading and its minimum corresponding to the smallest opening capable of driving the alternator when idling. The potentiometer P2 for secondary adjustment is adjusted by hand or through a remote adjusting arrangement.

The negative plate of the condenser C is connected with the negative terminal of the supply of energy through a reaction resistance R3 adapted to ensure linearity of loading and it is also connected with the base of the so-called gate transistor TR1 and with the collector of the so-called discharge transistor TR4. The base of the latter is connected directly with the output D1 of the pulse shaper D and it is furthermore connected through the resistance R4 with a positive biasing supply. The pulses appearing at D1 ensure conductivity for the transistor TR4 and their duration is sufficient for ensuring a complete discharge of the condenser C.

The emitter of the gate transistor TR1 being biased by a voltage divider P11 providing a threshold voltage V, said transistor becomes conductive each time the voltage of the condenser C rises beyond said threshold V. The positive pulse appearing then on the collector of TR1, which is loaded by a resistance R11, is transmitted through a coupling condenser C1 to the input terminal E1 of a bistable multivibrator including two transistors TR2—TR3, said input terminal E1 being negatively biased by the voltage divider P12. The other input terminal E2 to said multivibrator is fed by the second output D2 of the pulse shaper D. Said bistable multivibrator is therefore normally conductive on the right-hand side and locked on the left-hand side.

The collector of the left-hand transistor TR2 connected with the point A of the wiring diagram is thus normally at a stationary potential such as E'. In contradistinction, when the gate transistor TR1 becomes conductive, the bistable multivibrator becomes conductive on the left-hand side and the point A is at another stationary voltage such as E. These two voltage values E and E' are measured with reference to the negative terminal of the supply of energy. To said point A are connected, through the parallel resistances R5 and R7, the bases of corresponding transistors TR5 and TR7, the latter being also connected with the negative terminal of the supply of energy through the corresponding condensers C5 and C7. Said transistors TR5 and TR7 being of the type NPN, their emitters are biased by corresponding voltage dividers P5 and P7 to an intermediate negative potential, while their collectors are grounded so as to be connected with the grounded positive terminal of the supply through corresponding loading resistances. Their outputs S5 and S6 are connected with the bases of corresponding transistors TR6 and TR8 which are loaded respectively by the relay 1 which controls the opening of the turbine blading and by the relay 2 corresponding to the closing of the turbine blading. A switch KO normally closed by the relay 1 controls, in series with a switch 32, the circuit opening the blading, while a switch KF which is normally open, under the action of the relay 2, controls the circuit closing the turbine blading, the latter circuit being in parallel with a switch 31.

Figure 2:
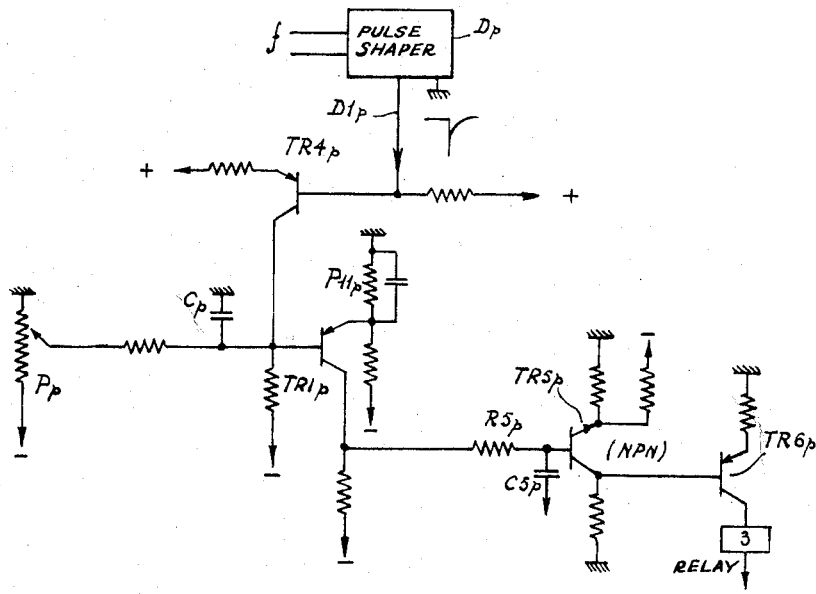
FIG. 2 is a wiring diagram of auxiliary means adapted to provide protection against overspeeds.

The normally closed switch 31 and the normally open switch 32 are controlled by a relay 3 associated with a protection circuit illustrated in FIG. 2, in which the same references associated with the subscript $p$ designate parts which are identical with or similar to those already described hereinabove with reference to FIG. 1. The base of the discharge transistor TR4$p$ is connected with the output D1$p$ of a pulse shaper D$p$ similar to pulse shaper D, but fed with the alternator voltage, so as to produce negative pulses at the frequency $f$ of the latter; the output voltage of the gate transistor TR1$p$ integrated by the circuit R5$p$—C5$p$ releases the relay 3 through the agency of the two-stage amplifier TR5$p$—TR6$p$.

The operation of the arrangement is as follows:

The time period $to$ required for loading the condenser C to the threshold potential V is governed by an equation such as:

$$\frac{1}{to} = aP + b$$

wherein:

$a$ is a constant.

P is the power provided by the turbine, the opening of the blading being defined by the position of the slider on the potentiometer P1.

$b$ is a parameter defined by the position of the slider on potentiometer P2.

When said time period $to$ is larger than the spacing $t$ between the so-called discharge pulses appearing at D1, the gate transistor TR1 remains constantly locked and the point A remains at its inoperative negative voltage E', while the transistors TR5 to TR8 are locked and the relays 1 and 2 are inoperative. The inoperative condition of the relay 1 controls through the switch KO the opening of the turbine blading, for instance through an electrically controlled gate.

When $to$ is smaller than the spacing $t$ of the discharge pulses acting on the condenser, the voltage at the point A is a periodical voltage of a rectangular shape and of a period $t$; said voltage is equal to E' during the period $to$ and to E during the remaining time $t-to$.

The time constants of the filters C5—R5 and C7—R7 being large with reference to $t$, the bases of the transistors TR5 and TR7 are brought to the same negative D.C. voltage:

$$u = \frac{E'to + E(t - to)}{t}$$

Assuming the two transistors have their emitters biased to the same value U, they remain locked as long as:

$$\frac{E'to + E(t - to)}{t} < U \text{ i.e. } t < \frac{E - E'}{E - U}to$$

Consequently:

$$t = \frac{1}{F - 16fo} < mto$$

($m$ being a constant)

or else:

$$aP - b < m(F - 16f)$$

or again:

$$z = P + k(f - fo) < o$$

Assuming:

$$k = \frac{16m}{a} \text{ and } fo = \frac{F}{16} - \frac{b}{16m}$$

As long as said amount $z$ remains negative, the opening of the blading continues, which has for its result an increase of P and, consequently, of $z$.

When $z$ becomes positive, the two transistors TR5 and TR7 become conductive. The relays 1 and 2 are engaged simultaneously, so as to open KO and to close KF. This provides a closing of the blading which leads to a reduction of P and, consequently, of $z$. Thus, a control is obtained which allows obtaining the relationship:

$$z = P + k(f - fo) = o$$

as in the case of mechanical regulators.

In practice and with a view to providing stability for the system, it is of advantage to slightly misadjust with reference to each other the biasing of the transistors TR5 and TR7 by acting for this purpose on the voltage dividers P5 and P7.

In order to examine the operation with further detail, I will consider the ordinary case of static conditions within 4%, for instance, which corresponds to a regulating energy.

$$k = \frac{P \text{ max.}}{2} \text{ assuming } F = 848 \text{ cycles}$$

$fo$ may be caused to vary between 50 and 52 cycles through the agency of the auxiliary adjusting potentiometer P2. Obviously, any other values may be adopted.

At the start, the means limiting the opening of the blading are opened slowly, until a value is reached which is slightly above zero power. The turbine starts and at first the frequency $f$ is too small for it to pass through the multiplying means at M. The condenser C is not discharged and the blading remains open at its minimum value.

When the frequency $f$ is capable of passing through the multiplying means, the condenser C may be discharged and the blading would open to a maximum if it were not held under a predetermined value by the means limiting said opening. The frequency continues rising until $f = fo$ which returns the opening of the blade to a minimum. The frequency $f = fo$ is then adjusted to the actual frequency of the network through action of the potentiometer P2, after which the alternator is coupled with the network. This being done, the means limiting the opening of the blading are released.

From this moment onwards, the network frequency predominates. The power fed by the alternator is then defined by the value of $fo$ and, consequently, by the position of the slider on the potentiometer P2. Said potentiometer P2 may be at a distance from the turbine, say on a control board where it replaces the conventional draw members. The potentiometer P2 may also be controlled through a remote adjusting system.

The safety means of the turbine may be caused to control the relay S which switches off the input at the frequency $f$. The blading closes then down to its minimum.

The preceding disclosure shows that the frequency cannot rise above 52 cycles, without a closing of the turbine. It may however be assumed that said frequency rises suddently above $$\frac{F}{16} = 53 \text{ cycles}$$

At such a moment, the ring-shaped modulator produces a frequency $16f-F$. In other words, the blading opens when the frequency increases. It is therefore necessary to associate with the system a protection against overspeeding, as provided by the arrangement illustrated in FIG. 2.

The condenser C$p$ is loaded by a predetermined voltage through the potentiometer P$p$ in a manner such that the time required for passing through the threshold of the gate transistor TR1$p$ may correspond to the limit frequency, say 52 cycles.

As long as the frequency $f$ of the alternator is lower than the limit frequency, the gate TR1$p$ opens periodically. The pulses produced maintain a certain positive voltage across the terminals of the condenser C5$p$; the transistors TR5$p$ and TR6$p$ feed current and the relay 3 remains operative. Its switch 32 remains closed and the switch 31 remains open.

When $f$ rises above the limit frequency of, say 52 cycles, the gate TR1 is no longer open and the relay 3 returns to its inoperative position. The switch 32 breaks the opening circuit of the blading, while the switch 31 closes the closing circuit. The same is the case when there is a lack of feed voltage, which ensures a complete positive safety for the arrangement.

My invention is obviously by no means limited to the embodiments selected and illustrated which have been given by way of a mere exemplification and of which the various parts may, in contradistinction, form the object of numerous modifications. Thus, for instance, it is possible to provide a complex control by associating with the potentiometers P1 and P2 one or more auxiliary potentiometers. It is also possible to omit, if required, the bistable multivibrator TR2—TR3 or to replace it by other means for modifying the shape of the control pulses passing out of the gate TR1.

Figure 3:
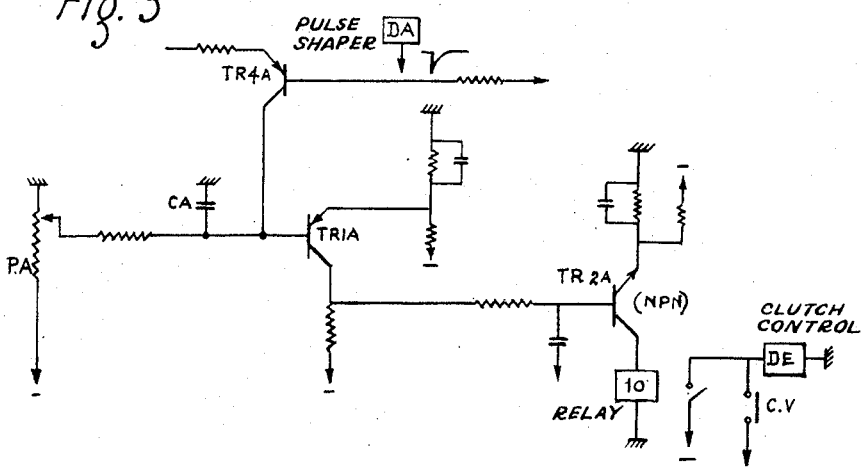
FIG. 3 is a wiring diagram similar to that illustrated in FIG. 2, but adapted to an application of the arrangement to the automatic control of the clutch between a driving shaft and a driven shaft.

The improved arrangement disclosed may be resorted to, for instance for the automatic control of a clutch connecting a driving shaft with a driven shaft. Such an automatic clutch may be executed, for instance, in the manner described in FIG. 3 illustrating a diagram similar to that illustrated in FIG. 2.

The discharge pulses of the condenser CA are supplied in the present case by a pulse shaper DA at a frequency proportional to the speed of the driving machine, which is not illustrated. A relay 10 which is directly controlled by a transistor TR2A is inoperative when the speed $v$ of the machine is higher than a value $vo$ defined by the position of the slider on the potentiometer PA. In contradistinction, the relay 10 is operative when $v$ is lower than $vo$. A clutch-controlling electromagnet DE is controlled either through the normally open switch controlled by the relay 10, or else, by a manually operated switch, or again by an alarm switch associated with or substituted for the switch inserted in series.

The operation of such an arrangement is very simple: when the speed of the machine drops under a value $vo$ defined by the location of the potentiometer slider PA, the relay 10 is fed and controls the operation of the electromagnet DE ensuring automatic disconnection of the clutch. The machine is reengaged when the speed rises above $vo$, so that the relay 10 is no longer energized. A pusher knob CV allows disconnecting by hand or through an alarm switch if required. Obviously, such an automatic clutch operation is suitable for machines other than turbines.

What I claim is:

1. An arrangement for regulating the speed of a machine associated with means feeding an operative fluid into it, comprising a condenser, a reference supply of voltage loading said condenser, an electronic gate adapted to be opened by the condenser upon raising of the condenser voltage above a predetermined value, means producing condenser-discharging pulses at a rhythm in synchronism with the speed of the machine to be regulated, and means controlled by the passage of said pulses through the open gate to adjust the means feeding fluid into the machine to return the speed of the latter to the desired value.

2. An arrangement for regulating the speed of a machine associated with means feeding an operative fluid into it, comprising a condenser, a D.C. voltage source, a potentiometer loading said condenser from said source and controlled by the means feeding fluid into the machine, an electronic gate adapted to be opened by the condenser upon raising of the condenser voltage above a predetermined value, means producing condenser-discharging pulses at a rhythm in synchronism with the speed of the machine to be regulated, and means controlled by the passage of said pulses through the open gate to adjust the means feeding fluid into the machine to return the speed of the latter to the desired value.

3. An arrangement for regulating the speed of a machine associated with means feeding an operative fluid into it, comprising a condenser, a first voltage source, a potentiometer loading said condenser from said first source and controlled by the means feeding fluid into the machine, a second voltage source an auxiliary potentiometer feeding the condenser from said second source, in parallel with the first-mentioned potentiometer, to modify the speed of loading of said condenser, an electronic gate adapted to be opened by the condenser upon raising of the condenser voltage above a predetermined value, means producing condenser-discharging pulses at a rhythm in synchronism with the speed of the machine to be regulated, and means controlled by the passage of said pulses through the open gate to adjust the means feeding fluid into the machine to return the speed of the latter to the desired value.

4. An arrangement for regulating the speed of a machine associated with means feeding an operative fluid into it, and an alternator driven by said machine, comprising a condenser, a reference supply of voltage loading said condenser, an electronic gate adapted to be opened by the condenser upon raising of the condenser voltage above a predetermined value, a frequency multiplier fed by the alternator, an oscillator producing current at a constant frequency, a modulator fed by said frequency multiplier and said oscillator to produce a modulated output current, a low-pass filter fed by said output current and adapted to feed a signal at a predetermined frequency equal to the frequency of modulation, a pulse shaper fed with said signal by said low-pass filter, to produce pulses, means actuated by the pulses from said deriving stage for discharging the condenser at a rhythm in synchronism with the speed of the machine, and means controlled by the passage of said pulses through the open gate to adjust the means feeding fluid into the machine to return the speed of the latter to the desired value.

5. An arrangement for regulating the speed of a machine associated with means feeding an operative fluid into it, comprising a condenser, a reference supply of voltage loading said condenser, an electronic gate adapted to be opened by the condenser upon raising of the condenser voltage above a predetermined value, means producing condenser-discharging pulses at a rhythm in synchronism with the speed of the machine to be regulated, two amplifiers fed with said pulses passing through the open gate, a relay controlled by each amplifier, and circuit means controlled by said relays for closing the fluid feeding means in response to the passage of said pulses through the open gate and opening the fluid feeding means in response to the blocking of said pulses by the gate when closed.

6. An arrangement for regulating the speed of a machine associated with means feeding an operative fluid into it, comprising a condenser, a reference supply of voltage loading said condenser, an electronic gate adapted to be opened by the condenser upon raising of the condenser voltage above a predetermined value, means producing condenser-discharging pulses at a rhythm in synchronism with the speed of the machine to be regulated, two amplifiers fed with said pulses passing through the open gate, each amplifier having at least one PNP transistor and at least one NPN transistor, a relay controlled by each amplifier, and circuit means controlled by said relays for closing the fluid feeding means in response to the passage of said pulses through the open gate and opening the fluid feeding means in response to the blocking of said pulses by the gate when closed.

7. An arrangement for regulating the speed of a machine associated with means feeding an operative fluid into it, comprising a condenser, a reference supply voltage loading said condenser, an electronic gate adapted to be opened by the condenser upon raising of the condenser voltage above a predetermined value, means producing condenser-discharging pulses at a rhythm in synchronism with the speed of the machine to be regulated, means controlled by the passage of said pulses through the open gate to adjust the means feeding fluid into the machine to return the speed of the latter to the desired value, and means for protection against overspeeds including an adjustable potentiometer adapted to produce a control voltage, an auxiliary condenser adapted to be charged from said control voltage and to be discharged at a rhythm in synchronism with the speed of the machine to be regulated, a gate opened by the discharge of the auxiliary condenser, a protecting relay controlled by the opening of said gate, a first circuit opening the means feeding fluid into the machine, a second circuit closing said means feeding fluid into the machine, a normally open switch in the first circuit and a normally closed switch in the second circuit, and means whereby the protecting relay controls said two switches.

8. An arrangement for the automatic control of a clutch connecting a driving shaft with a driven shaft for regulating the speed of said driven shaft, comprising, in combination with said clutch, electromagnetic means operable to disconnect said clutch, a relay energizing said electromagnetic means, a condenser, a reference supply of voltage loading said condenser, an electronic gate opened by the condenser upon raising of the condenser voltage above a predetermined value, means producing pulses for discharging said condenser at a rhythm in synchronism with the rotation of the driven shaft to be regulated, and means controlled by the passage of said pulses through said open gate to energize said relay.

References Cited in the file of this patent

UNITED STATES PATENTS

| | | |
|---|---|---|
| 2,382,847 | Baumann | Aug. 14, 1945 |
| 2,408,451 | Sorensen | Oct. 1, 1946 |
| 2,827,910 | Wells et al. | Mar. 25, 1958 |
| 2,875,575 | Peterson | Mar. 3, 1959 |
| 2,980,369 | Ruof | Apr. 18, 1961 |